United States Patent [19]
Rossin et al.

[11] Patent Number: 5,886,711
[45] Date of Patent: Mar. 23, 1999

[54] METHOD AND APPARATUS FOR PROCESSING PRIMITIVES IN A COMPUTER GRAPHICS DISPLAY SYSTEM

[75] Inventors: Theodore G. Rossin; Alan S. Krech, Jr.; S Paul Tucker, all of Fort Collins, Colo.

[73] Assignee: Hewlett-Packard Companu, Palo Alto, Calif.

[21] Appl. No.: 840,361

[22] Filed: Apr. 29, 1997

[51] Int. Cl.$^6$ ...................................................... G06F 15/16
[52] U.S. Cl. ........................ 345/503; 345/519; 345/426; 345/507
[58] Field of Search .................................. 345/424, 426, 345/503, 519, 522, 507, 515

[56] References Cited

U.S. PATENT DOCUMENTS

| | | | |
|---|---|---|---|
| 5,357,599 | 10/1994 | Luken | 345/434 |
| 5,574,835 | 11/1996 | Duluk, Jr. et al. | 345/421 |

*Primary Examiner*—Kee M. Tung

[57] ABSTRACT

The present invention provides a method and apparatus for processing primitives in a computer graphics display system. The present invention comprises a geometry accelerator for processing polygons to provide two-sided lighting for front and back facing polygons. The geometry accelerator comprises a lighting machine and a memory device in communication with the lighting machine. The geometry accelerator receives command data, vertex data, and parameter data from a central processing unit (CPU) of a computer graphics display system. The vertex data comprises polygon vertex color data, vertex coordinate data and vertex normal data. The parameter data comprises front and back material parameters. The command data comprises information relating to the type of primitive to be processed by the lighting machine. The geometry accelerator looks at the command data to determine whether the polygon is a front or back facing polygon and informs the lighting machine as to whether the polygon is a front or back facing polygon. The lighting machine will then fetch the correct set of material parameters and use them to calculate lighting.

23 Claims, 6 Drawing Sheets

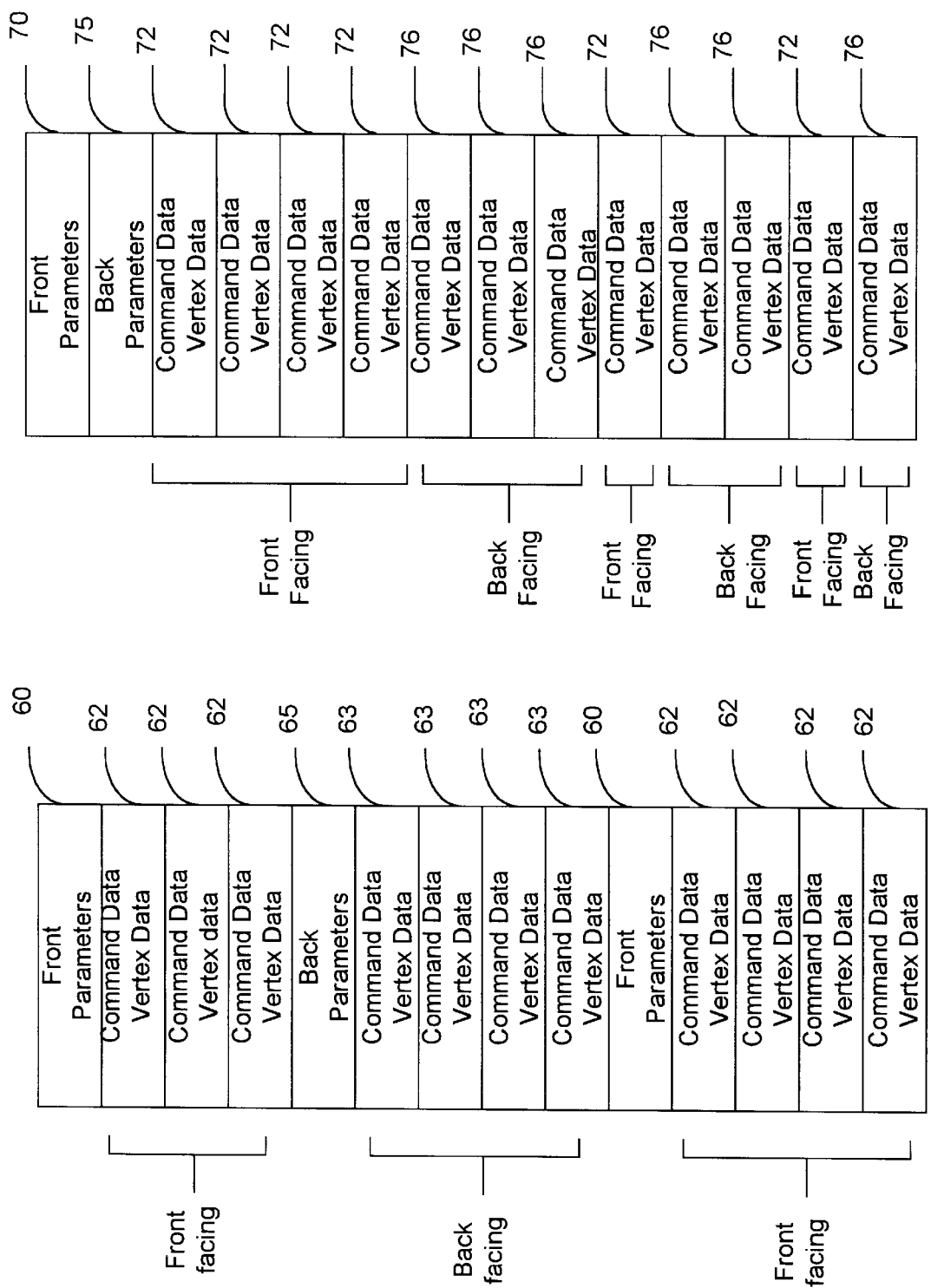

FIG. 6

METHOD AND APPARATUS FOR PROCESSING PRIMITIVES IN A COMPUTER GRAPHICS DISPLAY SYSTEM

TECHNICAL FIELD OF THE INVENTION

The present invention generally relates to computer graphics display systems and, more particularly, to a method and apparatus which reduces the amount of data being sent to a lighting machine comprised in a geometry accelerator of a computer graphics display system, thereby increasing the throughput of the geometry accelerator.

BACKGROUND OF THE INVENTION

Computer graphics display systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer defines the primitive in terms of the X, Y and Z coordinates of its vertices, the normals of the vertices, $N_x$, $N_y$ and $N_z$, and the red, green, blue and alpha (R, G, B and $\alpha$) color values of each vertex. Alpha is a transparency value. Additional primitive data may be used in specific applications. Rendering hardware interpolates all of this data (hereinafter referred to as vertex data) to compute the display screen pixels that represent each primitive, and the R, G, B and $\alpha$ values for each pixel.

The graphics machine generally includes a geometry accelerator, a rasterizer, a frame buffer controller and a frame buffer. The graphics machine may also include texture mapping hardware (not shown). The geometry accelerator receives vertex data from the host CPU that defines the primitives that make up the view to be displayed. The geometry accelerator typically comprises a transform component which receives vertex data from the CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is kept for further processing. The illumination component calculates the final colors of the vertices of the primitives based on the vertex data and based on lighting conditions. The plane equations component generates floating point equations which define the image space within the vertices. The floating point equations are later converted into fixed point equations and the rasterizer and texture mapping hardware generate the final screen coordinate and color data for each pixel in each primitive.

The operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. The data for a single quadrilateral may be on the order of, for example, 56 words of 32 bits each. Additional data transmitted from the host computer to the geometry accelerator includes illumination parameters, clipping parameters and any other parameters needed to generate the graphics display.

One way of improving the throughput of the geometry accelerator is to minimize the overall amount of data that must be processed by it. One way to do this is to minimize redundancy in the data being sent to the geometry accelerator. The illumination component of the geometry accelerator receives red, green, blue and alpha (R, G, B and $\alpha$) data, X, Y, and Z data, and $N_x$, $N_y$ and $N_z$, data for each primitive received by the geometry accelerator. The X, Y and Z coordinates define the locations of the vertices of the primitives on the display screen whereas the $N_x$, $N_y$ and $N_z$, data define the directions of the normals of the vertices of the primitives. The illumination component also receives light material parameters and light source parameters. The material parameters specify the material of which the model is comprised. The light source parameters specify the location of the light source in 3-D space with respect to the model and the direction of the light. The illumination component processes all this data and outputs new R, G and B data for each vertex.

Some computer graphics display systems are capable of supporting two-sided lighting. In order to support two-sided lighting of models being displayed, the illumination component in such a system receives two sets of material parameters, one for the front-facing primitives and one for the back-facing primitives. Generally, each set of material parameters includes parameters which describe how the material reflects ambient light, diffuse light and specular light, as well as how the material emits light. Currently, the architecture of computer graphics display systems is such that whenever the primitive being received by the illumination component is facing in a different direction from the previous primitive, a new set of material parameters is sent to the illumination component, along with the R, G, B and $\alpha$ data, the X, Y, and Z data, and the $N_x$, $N_y$ and $N_z$ data defining the vertices of the primitive. Thus, the more often the direction in which the primitives are facing changes, the more often new sets of material parameters must be sent to the illumination component. This presents a substantial performance penalty which reduces throughput of the geometry accelerator and of the computer graphics display system as a whole.

In some systems which support two-sided lighting, the determination as to which direction the polygon is facing is made in the graphics hardware. This is generally the case in more recent computer graphics display systems. In other systems which support two-sided lighting this determination is made by the Application Program Interface (API) which is the software interface between the host CPU and the graphics hardware. This is generally the case with older systems. It is also known to allow the user to specify which direction the polygons are facing. With respect to systems which make the determination as to polygon direction in the graphics hardware, these systems generally do not support older APIs which make the determination as to polygon direction in the API software.

Accordingly, a need exists for a method and apparatus which maximizes the processing speed and efficiency of the geometry accelerator by reducing the amount of data being sent to it to provide a geometry accelerator with increased throughput while providing support for many different APIs.

SUMMARY OF THE INVENTION

The present invention provides a method and apparatus for processing primitives in a computer graphics display system. The present invention comprises a geometry accelerator for processing polygons to provide two-sided lighting for front and back facing polygons. In order to provide two-sided lighting, a determination must be made as to whether a polygon to be processed by the lighting machine is a front facing or back facing polygon. In accordance with the present invention, a determination as to which direction a polygon to be processed by the lighting machine is facing may be made by the user, by the API or by the geometry accelerator. The geometry accelerator of the present invention comprises a lighting machine and a memory device in communication with the lighting machine. Preferably, the geometry accelerator of the present invention is comprised in a single integrated circuit. The geometry accelerator of the present invention receives command data, vertex data, and parameter data from a central processing unit of a computer graphics display system and makes the data available to the lighting machine and the memory device. The vertex data comprises polygon vertex color data, vertex coordinate data and vertex normal data. The parameter data comprises front and back material parameters. The command data comprises information relating to the type of primitive to be processed by the lighting machine. The command data may also comprise information indicating whether a determination as to which direction a polygon is facing is to made by the user, the API, or the geometry accelerator.

If the determination as to which direction the polygon is facing is to be made by the user or the API, the command data will indicate to the geometry accelerator that it is not to make this determination. The command data will also indicate to the geometry accelerator whether the polygon is a front facing or back facing polygon. The geometry accelerator will then inform the lighting machine as to whether the polygon is a front or back facing polygon. If the determination as to which direction the polygon is facing is to be made by the geometry accelerator, the geometry accelerator will determine the direction of the polygon using a direction algorithm and inform the lighting machine as to whether the polygon is a front facing or back facing polygon.

The geometry accelerator causes the front and back material parameters to be stored at addresses in the memory device. Each time a front facing polygon is received by the lighting machine, at least one bit provided by the geometry accelerator to the lighting machine causes the lighting machine to fetch the front material parameters from the memory device. Each time a back facing polygon is received by the lighting machine, at least one bit provided by the geometry accelerator to the lighting machine causes the lighting machine to fetch the back material parameters from the memory device. When the front material parameters are fetched, the front material parameters and at least a portion of the polygon vertex data are used by the lighting machine to calculate new colors for the vertices of the front facing polygons. When the back material parameters are fetched, the back material parameters and at least a portion of the polygon vertex data are used by the lighting machine to calculate new colors for the vertices of the back facing polygon.

In accordance with the preferred embodiment, each time a front facing polygon is received by the lighting machine, a direction bit is asserted by the geometry accelerator which informs the lighting machine to fetch the front material parameters from the memory device. Similarly, each time a back facing polygon is received by the lighting machine, the direction bit is de-asserted by the geometry accelerator which informs the lighting machine to fetch the back material parameters from the memory device. If the API or user is responsible for determining the direction of the polygons, a mode bit provided to the geometry accelerator is asserted. In response to the asserted mode bit, the geometry accelerator will not calculate the polygon direction but, rather, will analyze one or more bits in the command data which inform the geometry accelerator which direction the polygon is facing. The geometry accelerator then will either cause the direction bit to be asserted or de-asserted which, in turn, informs the lighting machine of which set of material parameters it should use. If the geometry accelerator is to determine the polygon direction, the mode bit will be de-asserted, in which case the geometry accelerator will determine the polygon direction using a direction algorithm and either assert or de-assert the direction bit depending on the direction of the polygon.

BRIEF DESCRIPTION OF THE DRAWINGS

FIG. 4 functionally illustrates the data structure of data sent to an illumination component of a geometry accelerator in accordance with the prior art.

FIG. 5 functionally illustrates the data structure of command, vertex and parameter data sent to the lighting machine of the present invention shown in FIG. 3.

FIG. 6 illustrates the front and back material parameters sent to the lighting machine of FIG. 3 in accordance with the preferred embodiment to perform two-sided lighting.

DETAILED DESCRIPTION OF THE INVENTION

Figure 1:
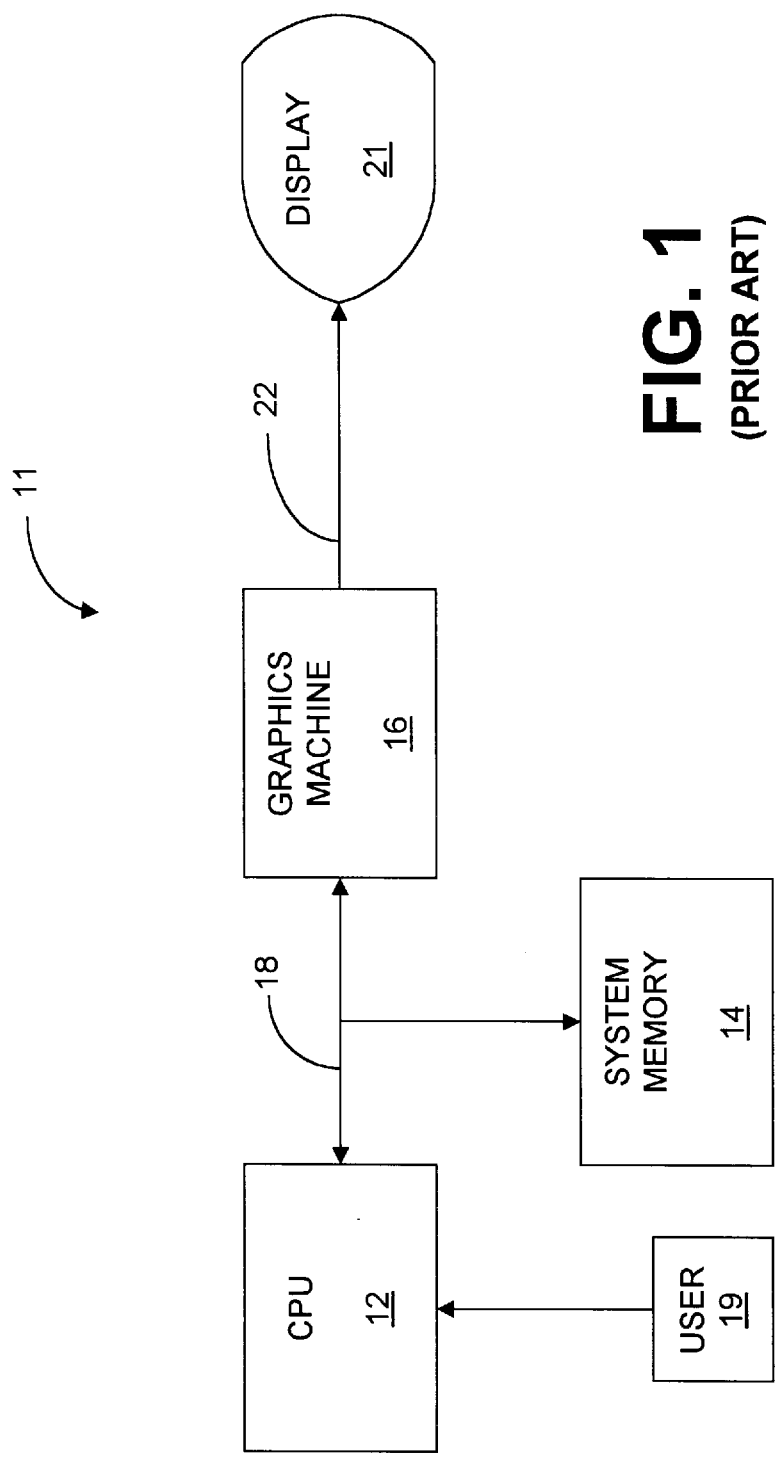
FIG. 1 illustrates a functional block diagram of a well known computer graphics display system.

The basic components of a conventional computer graphics display system are shown in FIG. 1. The computer graphics display system 11 comprises a CPU 12, a graphics machine 16, system memory 14 and a display device 21. The CPU 12 communicates with the graphics machine 16 and system memory 14 via bus 18. The graphics machine 16 communicates with display device 21 via bus 22. A user 19 communicates with the CPU 12 via a peripheral device, such as a keyboard or mouse, to indirectly control the data being sent to the graphics machine 16, thereby controlling the rendering of the image being displayed on the display device 21.

Figure 2:
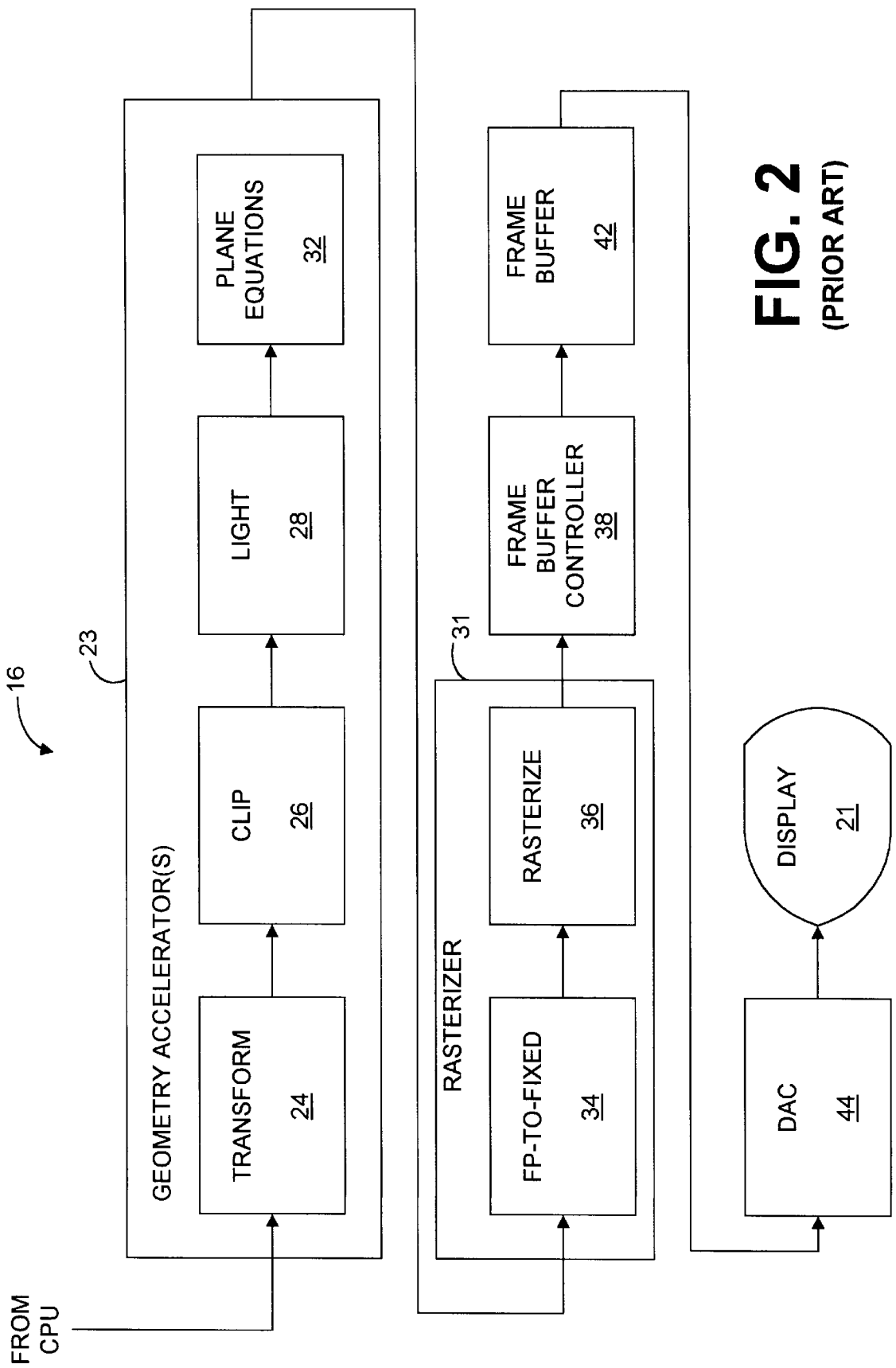
FIG. 2 illustrates a functional block diagram of the geometry accelerator and rasterizer of the computer graphics display system shown in FIG. 1.

The basic components of the graphics machine 16 are shown in FIG. 2. The graphics machine 16 comprises a geometry accelerator 23, a rasterizer 31, a frame buffer controller 38 and a frame buffer 42. The graphics machine 16 may also include texture mapping hardware (not shown). The geometry accelerator 23 receives data from the host CPU 12 that defines the primitives (e.g., triangles) that make up the view to be displayed. The geometry accelerator 23 typically comprises a transform component 24, a clipping component 26, an illumination component 28, and a plane equations component 32. The transform component 24 receives vertex data and commands from the CPU 12 and performs transformations on the vertex data, such as rotation, translation, or scaling (or a combination of these operations) of the image space defined by vertex data. The clipping component 26 clips the vertex data so that only vertex data relating to primitives that make up the portion of the view that will be seen by the user is kept for further processing. All other vertex data is tossed. This is accomplished by determining whether any of the vertex coordinates of the primitive are located outside of the image space that will be seen by the user. If so, the primitive is clipped so that only the vertex data corresponding to the portion of the primitive inside of the image space is kept for further processing.

The lighting machine 28 calculates the final colors of the vertices of the primitives based on the vertex data and based on lighting parameters provided to the lighting machine 28.5. The plane equations component 32 generates floating point equations which define the imagespace within the vertices on the display screen. The floating point equations are converted into fixed point equations by floating point-to-fixed point component 34 before being rasterized. The rasterizing component 36 of rasterizer 31 and the texture mapping hardware (not shown) generate the final screen coordinates and color data for each pixel in each primitive. Once the screen coordinates and color data for each pixel have been generated, frames of pixel data are stored in a frame buffer 42 for display on a video display screen 21.

The operations of the geometry accelerator are computationally very intense due to the large volume of data transferred between the host computer and the geometry accelerator and because of the fact that the geometry accelerator normally is required to perform several hundred million floating point calculations with the data per second. In accordance with the present invention, it has been determined that the throughput of the computer graphics display system can be improved by reducing the amount of redundancy in the data being received and processed by the geometry accelerator. Specifically, in accordance with the present invention, it has been determined that the throughput of the computer graphics display system can be improved by eliminating redundancy in the lighting parameter data being received and processed by the lighting machine of the geometry accelerator, as discussed in detail below.

Figure 3:
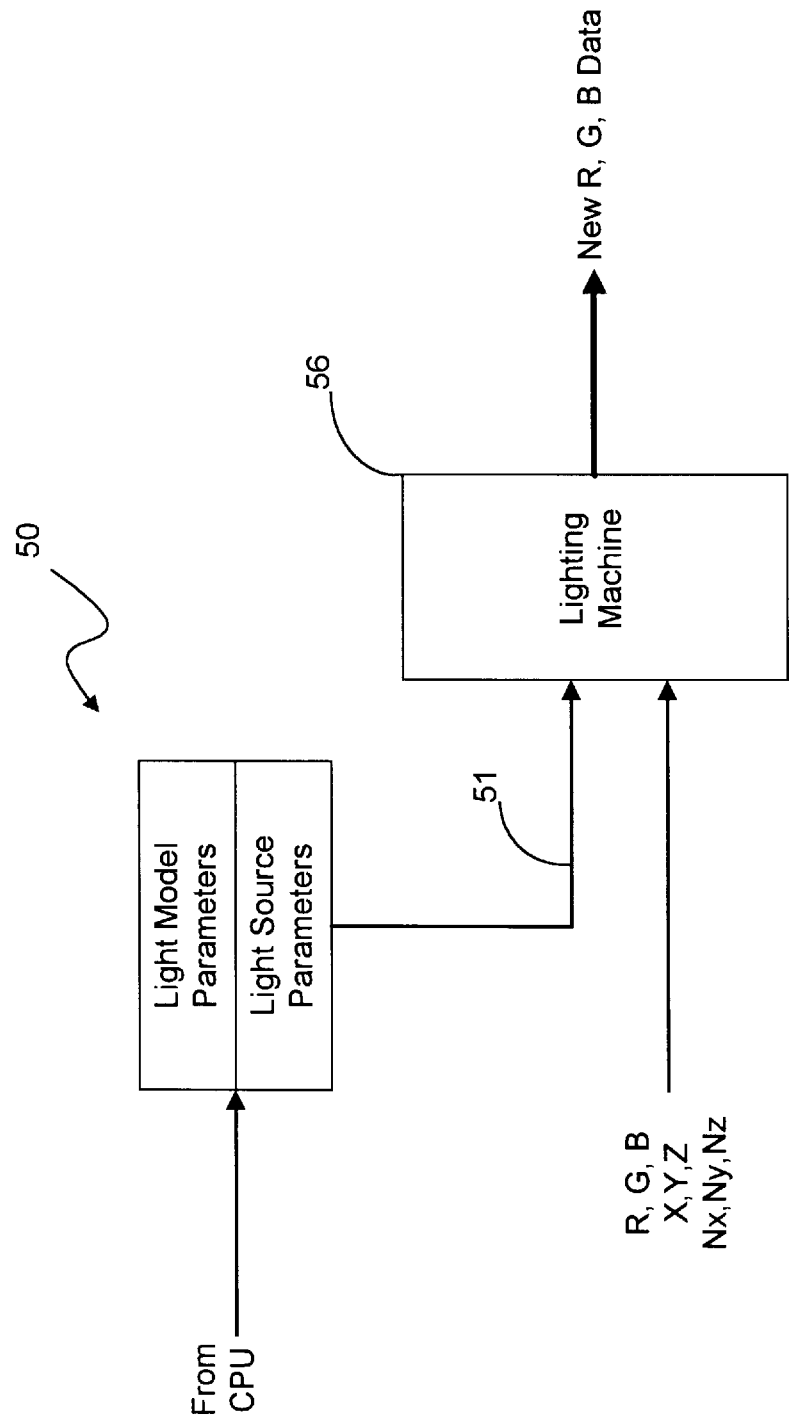
FIG. 3 illustrates a functional block diagram of the lighting machine of the present invention in accordance with a preferred embodiment.

FIG. 3 is a block diagram illustrating the lighting machine 56 of the present invention which receives lighting parameters 50 which are stored in memory inside of the geometry accelerator, as discussed in detail below. The lighting machine 56 of the geometry accelerator receives red, green, blue and alpha (R, G, B and α) data, X, Y, and Z data, and $N_x$, $N_Y$ and $N_z$ data for each primitive as well as command data which specifies, for example, the type of primitive and the direction in which it is facing. The lighting machine 56 also receives light model material parameters and light source parameters, which are collectively referred to hereinafter as lighting parameters 50. The lighting parameters 50 preferably are stored in RAM inside of the geometry accelerator. The light model material parameters specify the material of which the object being rendered is comprised, which determines how the object being displayed reflects or emits light. The light source parameters specify the location(s) of the light source(s) in 3-D space with respect to the model, the color of the source(s) and the direction of the light. The lighting machine 56 processes all of this data and outputs new R, G and B data for each vertex of the primitive.

In order to support two-sided lighting of models being rendered, the lighting machine 56 utilizes two sets of light model material parameters for polygons, one for the front-facing polygons and one for the back-facing polygons. The light source parameters are the same for front and back facing polygons. Polygons are closed figures defined by three or more line segments. Two-sided lighting is unnecessary where the primitives are points or lines. Therefore, the following discussion relating to two-sided lighting will be limited to polygons.

The manner in which polygons are rendered may differ depending on whether the polygons are front facing or back facing. For example, if the object being rendered is a solid sphere, only the front faces of the polygons are seen and, therefore, two-sided lighting is unnecessary. However, if a cutaway of the sphere is to be displayed such that the inner surface of the sphere is visible to the user, it may be desirable to specify different light model material parameters for the front and back facing polygons.

Known computer graphics display systems which support two-sided lighting require that a new set of light model material parameters be sent to the lighting machine, along with the vertex data (i.e., color data, coordinate data and normal data), whenever the polygon being received by the lighting machine is facing in a different direction from the previous polygon. This is functionally illustrated in FIG. 4. The determination of whether the polygon is front facing or back facing may be made by the application program interface (API), by the user, or by the geometry accelerator.

In accordance with the prior art systems, each time a determination is made that the polygon direction has changed from back facing to front facing, the material parameters for front facing polygons 60 must be sent to the geometry accelerator along with the command and vertex data 62 relating to each front facing polygon. The front material parameters 60 are loaded into memory in the geometry accelerator. The commands sent with the vertex data cause the front material parameters to be accessed from memory and the vertex data to be processed in accordance with the front material parameters. Each time a determination is made that the polygon direction has changed from back facing to front facing, the material parameters 65 for back facing polygons must be sent to the geometry accelerator along with the command and vertex data 63 relating to each back facing polygon. The back material parameters 65 are loaded into memory in the geometry accelerator. The commands sent with the coordinates cause the back material parameters 65 to be accessed from memory and the vertex data 63 to be processed in accordance with the back material parameters. Therefore, the overall amount of data which must be sent to and processed by the geometry accelerator is great and thus adversely affects the throughput of the geometry accelerator.

FIG. 5 functionally illustrates the manner in which the present invention supports two-sided lighting. In accordance with the present invention, front and back material parameters 70 and 75, respectively, are sent to the geometry accelerator where they are stored at predetermined addresses in memory. Subsequently, each time command and vertex data 72 is sent for a front facing polygon, the lighting machine of the present invention fetches the front material parameters from memory and processes the vertex data using the front material parameters. Each time command and vertex data 76 is sent for a back facing polygon, the lighting machine of the present invention fetches the back material parameters from memory and processes the vertex data using the back material parameters. Thus, in accordance with the present invention, the front and back material parameters only need to be sent to the geometry accelerator once, unless it is deemed desirable or necessary to alter the material parameters themselves.

In accordance with the present invention, the determination of which direction the polygon is facing can be made by the user, the API or the geometry accelerator. If the determination is made by the user or the API, one or more mode bits sent by the host CPU to the geometry accelerator will indicate that this determination has already been made. The mode bit(s) can be comprised in the command data being sent to the geometry accelerator or it may be supplied separately by the host CPU to the geometry accelerator. The geometry accelerator will then analyze one or more bits in the command data to determine whether the polygon is front facing or back facing. The geometry accelerator will then inform the lighting machine as to which set of material parameters to use. In accordance with the preferred embodiment, the geometry accelerator will assert a direction bit provided to the lighting machine if the polygon is front facing and de-assert the direction bit provided to the lighting machine if the polygon is back facing.

Existing APIs allow the user to tell the API that the user is making the determination so that the API will not make the determination. For example, the API known as Starbase, developed by Hewlett Packard, provides the option of allowing the user rather than Starbase to make the determination as to which direction the polygons are facing. The manner in which this can be accomplished is well known in the art and is disclosed in "Starbase Graphics Techniques", 1991, which is incorporated herein by reference.

If the determination as to which direction the polygon is facing is to be made by the geometry accelerator, the mode bit(s) sent provided to the geometry accelerator will indicate to the geometry accelerator that it is to make this determination. Once the geometry accelerator makes this determination, the geometry accelerator will inform the lighting machine of which set of material parameters to use. In accordance with the preferred embodiment, the geometry accelerator will either assert or de-assert the direction bit provided to the lighting machine to inform the lighting machine of which set of material parameters to use.

Therefore, in accordance with the present invention, the determination as to which direction a polygon sent to the geometry accelerator is facing can be made by a user, by the API or by the geometry accelerator. It should be noted that the location at which this determination is made, i.e., whether it is made by the user, the API or the geometry accelerator, is irrelevant to the lighting machine. Once the determination has been made, the geometry accelerator merely informs the lighting machine as to which set of material parameters to use. Therefore, the computer graphics display system of the present invention is capable of supporting many different APIs, including, but not limited to, Starbase, PEX, PHIGS and OpenGL.

Figure 6:
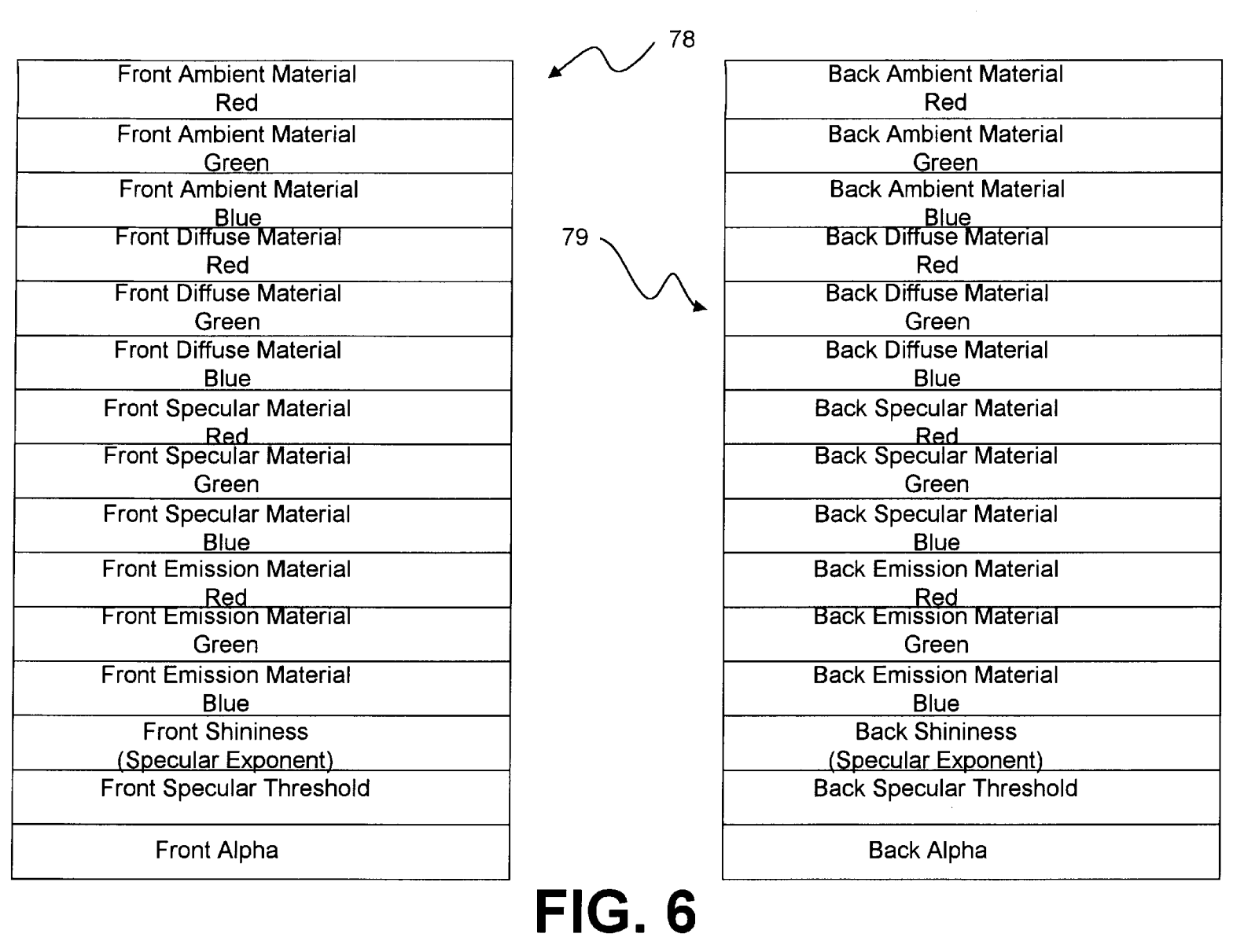

FIG. 6 is a table which lists the front material parameters 78 and the back material parameters 79 to be utilized for the front and back facing polygons, respectively, in accordance with the preferred embodiment of the present invention. The list is not exhaustive. In the interest of brevity, a description of each of the material parameters listed in the table will not be provided herein because the meaning of each of these terms is well understood by those skilled in the art. It should also be noted that the present invention is not in any way limited with respect to the material parameters utilized.

Generally, the material properties of an object define how it reflects light. The ambient, diffuse and specular colors of an object, as well as the shininess of an object and the color of light emitted by the object, can be specified with the material parameters. Preferably, the material parameters are specified in accordance with the OpenGL standards. A detailed discussion of these parameters can be found in *Open GL Programming Guide, Release* 1, 1993, by Neider, Davis and Woo, which is incorporated herein by reference. The diffuse and ambient parameters define the color of ambient and diffuse light reflected by an object. The diffuse reflectance is a function of the color of the incident diffuse light and the angle of the incident light relative to the normal to the surface of the object. Where the incident light falls perpendicular to the object, the diffuse reflection is greatest. Ambient reflection, on the other hand, is most noticeable where the object receives no direct illumination. Ambient reflection is a function of the global ambient light and ambient light from individual light sources. Diffuse and ambient reflectance are not affected by the position of the viewpoint. For real-world objects, the color of ambient and diffuse reflectance is usually the same. Specular reflection is brightest along the direct angle of reflection. Unlike diffuse and ambient reflection, the amount of specular reflection seen by a viewer depends on the location of the viewpoint. The shininess of an object is derived from the specular reflectance of the object and is based on the size and brightness of the highlight produced by the specular reflection. The emission parameter is defined by specifying the RGBA colors of the object to make it appear that the object is giving off light.

Figure 7:
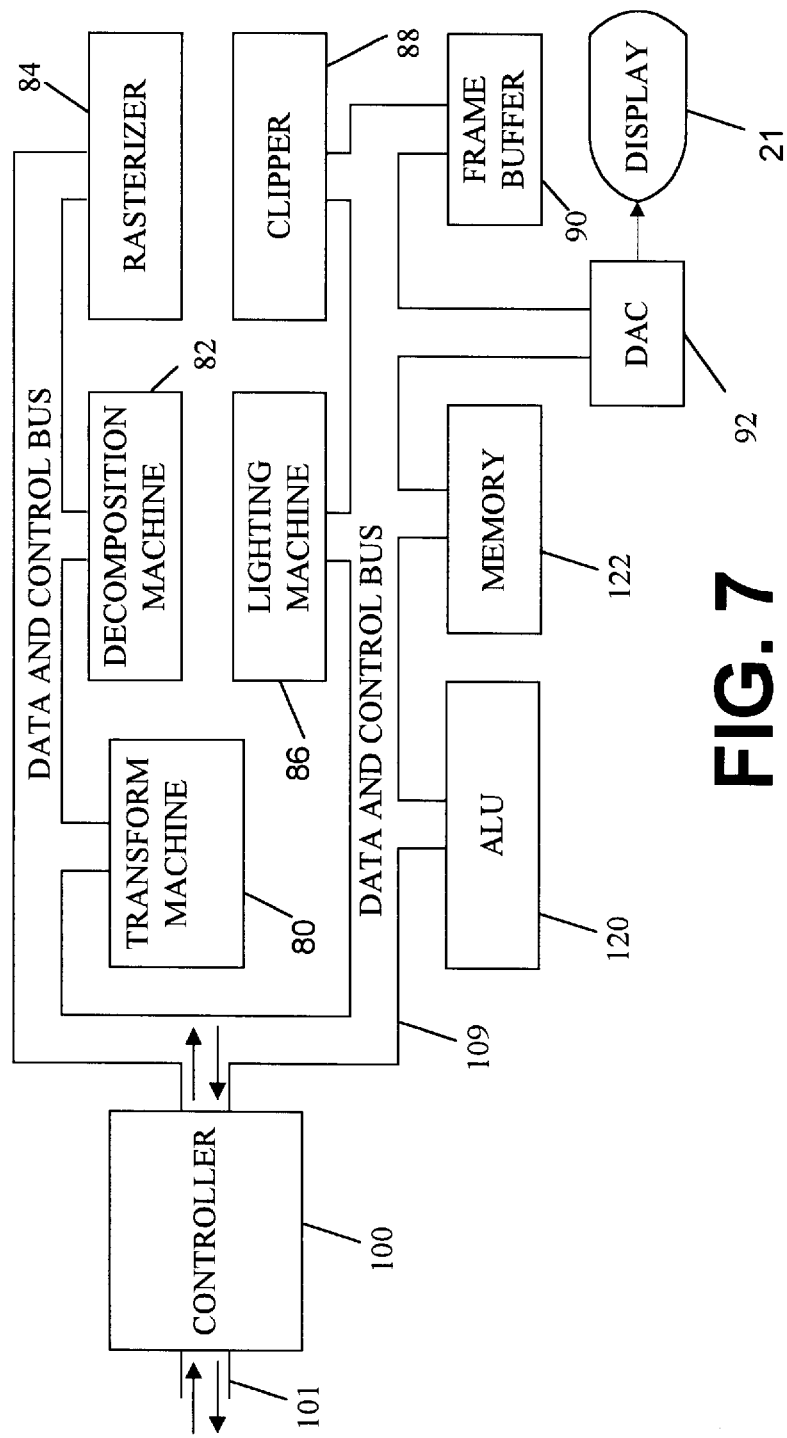
FIG. 7 illustrates a functional block diagram of the geometry accelerator of the present invention in accordance with the preferred embodiment connected to a frame buffer and to a display.

FIG. 7 illustrates a functional block diagram of the graphics machine of the present invention in accordance with a preferred embodiment. The graphics machine of the present invention utilizes the light source parameters and the light material parameters to calculate the lighting of the object being rendered by the computer graphics display system. In order to calculate the lighting, a set of mathematical equations is utilized. The mathematics implemented by the present invention to perform lighting, in accordance with the preferred embodiment of the present invention, are discussed in detail in *OpenGL Programming Guide*, supra, pages 188–192, and are well known to those skilled in the art. Therefore, a discussion of the mathematics implemented by the present invention to perform lighting will not be provided herein. It should be noted that the present invention is not limited with respect to the mathematics utilized to perform lighting.

As shown in FIG. 7, the graphics machine of the present invention comprises a controller 100 that communicates with the CPU 12 (see FIG. 1) across a channel 101. Preferably, the graphics machine of the present invention is implemented as a single integrated circuit comprising several state machines. Preferably, all of the components shown in FIG. 7 are implemented in the integrated circuit except for the frame buffer 90, digital-to-analog converter (DAC) 92 and display 21. The controller 100, which itself is a state machine, communicates with the various state machines 80, 82, 84, 86 and 88, with internal memory 122, with arithmetic logic unit (ALU) 120 and with other devices by way of a data and control bus 109. The controller 100 monitors, polices and directs the actions of the other state machines. The transform state machine 80, decomposition state machine 82, lighting state machine 86, and clipper state machine 88 are all in communication with the controller 100 and with each other by way of data and control bus 109. The rasterizer 84, frame buffer 90, and DAC 92 are also in communication across the same bus.

It should be noted that any of the components of the graphics machine may be implemented external to the integrated circuit. In this case, the external components will be in communication with the integrated circuit via a separate control path. It should also be noted that the components of the graphics machine may be implemented as separate integrated circuits, as discrete-component circuits, or in software. It will be apparent to those skilled in the art that the graphics machine of the present invention can be implemented in many different ways to accomplish the objectives of the present invention.

In accordance with the preferred embodiment of the present, the lighting parameters are sent by the CPU (not shown) to the controller 101 which routes them to memory 122 where they are stored. As the command and vertex data (FIG. 5) is received by the lighting machine 86, the vertex data is processed by the ALU 120 in accordance with the command data received by the lighting machine 86. When the polygon direction is to be determined by the user or the API, the mode bit(s) received by the controller 100 from the host processor is asserted. The controller 100 then analyzes one or more bits in the command data to determine whether the polygon is front facing or back facing. The controller 100 either asserts or deasserts a direction bit being provided to the lighting machine 86 to indicate to the lighting machine 86 whether the polygon received is front facing or back facing. The lighting machine 86 then fetches the correct set of material parameters from memory 122 and causes the ALU 120 to perform the necessary mathematical operations on the vertex data being received by the lighting machine 86.

In accordance with the preferred embodiment of the present invention, the ALU 120 is a shared resource which is used by each of the components of the geometry accelerator. However, for the purposes of performing lighting, the ALU 120 can be viewed as part of the lighting machine 186 in that the ALU 120 works in conjunction with the lighting machine 186 to do the mathematical calculations required to perform lighting.

If the polygon received by the lighting machine 86 is front facing, as indicated by the direction bit, the lighting machine 86 fetches the front material parameters from memory 122 and directs the ALU 120 to perform the appropriate mathematical calculations using the front material parameters. If the polygon received by the lighting machine is back facing, as indicated by the direction bit, the lighting machine 86 fetches the back material parameters from memory 122 and directs the ALU 120 to perform the appropriate mathematical calculations using the back material parameters. Each time the direction of the incoming polygon changes from front facing to back facing, one or more bits in the command data provides an indication to the controller 100 that the polygon is facing in the back direction. The controller 100 then causes the lighting machine 86 to fetch the back material parameters from memory 122 and the vertex data to be processed by the ALU 120 using the back material parameters. Similarly, each time the direction of the incoming polygon changes from back facing to front facing, one or more bits in the command data provides an indication to the controller 100 that the polygon is facing in the front direction. The controller 100 then causes the lighting machine 86 to fetch the front material parameters from memory 122 and the vertex data to be processed by the ALU 120 using the front material parameters lighting machine 86 that the polygon is facing in the front direction.

If the polygon direction is to be determined by the geometry accelerator, the mode bit(s) provided to the controller 100 from the host CPU will be de-asserted. The controller 100 will cause the ALU 120 to determine the polygon direction in accordance with a direction algorithm, such as, for example, the OpenGL direction algorithm. When the ALU 120 determines that the polygon is a front facing polygon, the controller 100 will cause the direction bit provided to the lighting machine 86 to be asserted, which will cause the lighting machine 86 to fetch the front material parameters from memory 122 and provide them to the ALU 120. When the ALU 120 determines that the polygon is a back facing polygon, the controller 100 will cause the direction bit provided to the lighting machine 86 to be de-asserted, which will cause the lighting machine 86 to fetch the back material parameters from memory 122 and provide them to the ALU 120.

Thus, in accordance with the present invention, it is unnecessary for the material parameters to be sent to the graphics machine each time the direction in which the polygon is facing has changed. When the API or the user is to determine the polygon direction, preferably only one bit in the command data is used to provide the indication to the geometry accelerator of which direction the polygon is facing.

It should be noted that the present invention has been described in accordance with preferred embodiments for purposes of illustration only. The present invention is not limited to these embodiments. It will be apparent to those skilled in the art that modifications, in addition to those specifically mentioned, may be made without deviating from the spirit and scope of the present invention.

What is claimed is:

1. A geometry accelerator for processing polygons in a computer graphics display system to provide lighting for front and back facing polygons, said geometry accelerator comprising:

a lighting machine; and a memory device in communication with said lighting machine, said geometry accelerator receiving command data, vertex data, and parameter data from a central processing unit of the computer graphics display system, said vertex data comprising vertex color data, vertex coordinate data and vertex normal data, said parameter data comprising at least front and back material parameters, said geometry accelerator storing said front and back material parameters at addresses in said memory device, and wherein each time a front facing polygon is received by said lighting machine, at least one bit provided to said lighting machine causes said lighting machine to fetch either the front material parameters or the back material parameters from said memory device, wherein said front material parameters and at least a portion of said vertex data are used by said lighting machine to calculate new colors for the vertices of the front facing polygons and wherein said back material parameters and at least a portion of said vertex data are used by said lighting machine to calculate new colors for the vertices of the back facing polygons.

2. The apparatus of claim 1, wherein said geometry accelerator is comprised in a single integrated circuit.

3. The apparatus of claim 1, wherein said geometry accelerator determines whether a polygon being received by said geometry accelerator is a front facing polygon or a back facing polygon by performing a direction algorithm.

4. The apparatus of claim 3, wherein when said geometry accelerator determines that the polygon received is a front facing polygon, said geometry accelerator asserts said at least one bit provided to said lighting machine and wherein when said geometry accelerator determines that the polygon received is a back facing polygon, said geometry accelerator de-asserts said at least one bit provided to said lighting machine, wherein when said at least one bit provided to said lighting machine is asserted, said lighting machine fetches said front material parameters from said memory device, wherein when said at least one bit provided to said lighting machine is de-asserted, said lighting machine fetches said back material parameters from said memory device.

5. The apparatus of claim 1, wherein said command data contains one or more bits indicating whether a polygon received by said geometry accelerator is a front facing polygon or a back facing polygon, and wherein said geometry accelerator analyzes said one or more bits in said command data and, based on the analysis, asserts said at least one bit provided to said lighting machine if the polygon received is a front facing polygon and de-asserts said at least one bit provided to said lighting machine if the polygon received is a back facing polygon.

6. The apparatus of claim 1, wherein said geometry accelerator causes said command data and said coordinate data to be stored at addresses in said memory device, and wherein said geometry accelerator accesses said command data stored at addresses in said memory device and analyzes said command data to determine whether a primitive to be processed by said geometry accelerator is a point, a line, or a polygon, and wherein when said geometry accelerator determines that the primitive is a polygon, said geometry accelerator determines whether the polygon is front facing or back facing based upon one bit in said command data accessed by said geometry accelerator.

7. The apparatus of claim 1, wherein said geometry accelerator receives at least one mode bit from said central processing unit, said at least one mode bit indicating whether or not said geometry accelerator is to calculate polygon direction for each polygon to determine whether the polygon received is a front facing or back facing polygon, wherein when said at least one mode bit is de-asserted, said geometry accelerator performs a direction algorithm to determine whether a polygon being received by said geometry accelerator is a front facing or a back facing polygon, wherein when said at least one mode bit is asserted, said geometry accelerator analyzes said command data to determine whether a polygon being received by said geometry accelerator is a front facing or back facing polygon, said geometry accelerator asserting said at least one bit provided to said lighting machine when said geometry accelerator determines that a polygon to be processed by said lighting machine is a front facing polygon, said geometry accelerator de-asserting said at least one bit provided to said lighting machine when said geometry accelerator determines that a polygon to be processed by said lighting machine is a back facing polygon.

8. The apparatus of claim 7, wherein when said at least one bit provided to said lighting machine is asserted, said lighting machine fetches said front material parameters from said memory device, wherein when said at least one bit provided to said lighting machine is de-asserted, said lighting machine fetches said back material parameters from said memory device.

9. A geometry accelerator for processing polygons in a computer graphics display system to provide lighting for front and back facing polygons, said geometry accelerator comprising:

a lighting machine;

a memory device in communication with said lighting machine, said geometry accelerator receiving command data, vertex data, parameter data and at least one mode bit from a central processing unit of the computer graphics display system, said vertex data comprising vertex color data, vertex coordinate data and vertex normal data, said parameter data including at least front and back material parameters, said geometry accelerator storing said front and back material parameters at addresses in said memory device, said at least one mode bit indicating to said geometry accelerator that either said geometry accelerator is to make a determination as to whether a polygon to be processed by said lighting machine is a front facing polygon or a back facing polygon or that said determination has already been made, wherein when said at least one mode bit indicates that said determination has already been made, said geometry accelerator analyzes said command data to determine whether the polygon to be processed by said lighting machine is a front facing polygon or a back facing polygon, wherein when said at least one mode bit indicates that said geometry accelerator is to make said determination, said geometry accelerator implements a direction algorithm to determine whether a polygon to be processed by said lighting machine is a front facing polygon or a back facing polygon, and wherein once it has been determined that a polygon to be processed by said lighting machine is a front facing polygon, said lighting machine fetches the front material parameters from said memory device, and wherein once it has been determined that the polygon to be processed by said lighting machine is a back facing polygon, said lighting machine fetches the back material parameters from said memory device, and wherein said front material parameters and at least a portion of said vertex data are used by said lighting machine to calculate new colors for the vertices of the front facing polygons and wherein said back material parameters and at least a portion of said vertex data are used by said lighting machine to calculate new colors for the vertices of the back facing polygons.

10. The apparatus of claim 9 wherein said geometry accelerator is comprised in a single integrated circuit.

11. The apparatus of claim 9 wherein each time it is determined that a polygon to be processed by said lighting machine is a front facing polygon, a direction bit sent by said geometry accelerator to said lighting machine causes said lighting machine to fetch the front material parameters from said memory device, and wherein each time it is determined that a polygon to be processed by said lighting machine is a back facing polygon, a direction bit sent by said geometry accelerator to said lighting machine causes said lighting machine to fetch the back material parameters from said memory device.

12. A geometry accelerator for processing polygons in a computer graphics display system to provide lighting for front and back facing polygons, said geometry accelerator comprising:

means for performing lighting, wherein said means for performing lighting performs mathematical calculations using parameter data and vertex data;

means for storing data, said means for storing data in communication with said means for performing lighting;

means for controlling a data flow between said means for performing lighting and said means for storing data, wherein said means for controlling a data flow receives command data, vertex data, and parameter data from a central processing unit of the computer graphics display system, said vertex data comprising vertex color data, vertex coordinate data, and vertex normal data, said parameter data including at least front and back material parameters, wherein said means for controlling a data flow causes said front and back material parameters to be stored at addresses in said means for storing data, and wherein each time a front facing polygon is received by said means for performing lighting, at least one bit provided to said lighting machine causes said means for performing lighting to fetch either the front material parameters or the back material parameters from said means for storing data, said front material parameters and at least a portion of said vertex data being used by said means for performing lighting to calculate new colors for the vertices of the front facing polygons, said back material parameters and at least a portion of said vertex data being used by said means for performing lighting to calculate new colors for the vertices of the back facing polygons.

13. The apparatus of claim 12 wherein said geometry accelerator is comprised in a single integrated circuit.

14. The apparatus of claim 12, wherein said geometry accelerator determines whether a polygon being received by said geometry accelerator is a front facing polygon or a back facing polygon by performing a direction algorithm.

15. The apparatus of claim 14, wherein when said geometry accelerator determines that the polygon received is a front facing polygon, said geometry accelerator asserts said at least one bit provided to said means for performing lighting and wherein when said geometry accelerator determines that the polygon received is a back facing polygon, said geometry accelerator de-asserts said at least one bit provided to said means for performing lighting, wherein when said at least one bit provided to said means for performing lighting is asserted, said means for performing lighting fetches said front material parameters from said means for storing data, wherein when said at least one bit provided to said means for performing lighting is de-asserted, said means for performing lighting fetches said back material parameters from said means for storing data.

16. The apparatus of claim 12, wherein said command data contains one or more bits indicating whether a polygon received by said geometry accelerator is a front facing polygon or a back facing polygon, and wherein said geometry accelerator analyzes said one or more bits in said command data and, based on the analysis, asserts said at least one bit provided to said means for performing lighting if the polygon received is a front facing polygon and de-asserts said at least one bit provided to said means for performing lighting if the polygon received is a back facing polygon.

17. The apparatus of claim 12, wherein said geometry accelerator causes said command data and said coordinate data to be stored at addresses in said means for storing data, and wherein said geometry accelerator accesses said command data stored at addresses in said means for storing data and analyzes said command data to determine whether a primitive to be processed by said geometry accelerator is a point, a line, or a polygon, and wherein when said geometry accelerator determines that the primitive is a polygon, said geometry accelerator determines whether the polygon is front facing or back facing based upon one bit in said command data accessed by said geometry accelerator.

18. The apparatus of claim 12, wherein said geometry accelerator receives at least one mode bit from said central processing unit, said at least one mode bit indicating whether or not said geometry accelerator is to calculate polygon direction for each polygon to determine whether the polygon received is a front facing or back facing polygon, wherein when said at least one mode bit is de-asserted, said geometry accelerator performs a direction algorithm to determine whether a polygon being received by said geometry accelerator is a front facing or a back facing polygon, wherein when said at least one mode bit is asserted, said geometry accelerator analyzes said command data to determine whether a polygon being received by said geometry accelerator is a front facing or back facing polygon, said geometry accelerator asserting said at least one bit provided to said means for performing lighting when said geometry accelerator determines that a polygon to be processed by said means for performing lighting is a front facing polygon, said geometry accelerator de-asserting said at least one bit provided to said means for performing lighting when said geometry accelerator determines that a polygon to be processed by said means for performing lighting is a back facing polygon.

19. The apparatus of claim 18, wherein when said at least one bit provided to said means for performing lighting is asserted, said lighting machine fetches said front material parameters from said means for storing data, wherein when said at least one bit provided to said lighting machine is de-asserted, said lighting machine fetches said back material parameters from said means for storing data.

20. A method of performing lighting in a geometry accelerator of a computer graphics display system comprising the steps of:

downloading a set of front material parameters to a memory device, said front material parameters defining light reflectivity characteristics of a particular material;

downloading a set of back material parameters to said memory device, said back material parameters defining light reflectivity characteristics of a particular material;

receiving command data and vertex data in said geometry accelerator, said command data including information indicating whether a primitive to be processed is a point, a line or a polygon, said vertex data defining colors, normals and spatial coordinates for each vertex of said primitive;

determining whether a primitive to be processed by a lighting machine comprised by said geometry accelerator is a front facing polygon or back facing polygon;

providing one or more bits to said lighting machine which cause said lighting machine to fetch parameters of said set of front material parameters from said memory device when a determination is made in the processing step that the primitive is a front facing polygon;

executing mathematical operations in said lighting machine using the vertex data relating to the front facing polygon and the fetched front material parameters;

providing one or more bits to said lighting machine which cause said lighting machine to fetch parameters of said set of back material parameters from said memory device when a determination is made in the processing step that the primitive is a back facing polygon;

executing mathematical operations in said lighting machine using the vertex data relating to the back facing polygon and the fetched back material parameters.

21. The method of claim 20, wherein said determining step comprises analyzing one or more bits in said command data to determine whether the primitive to be processed by said lighting machine is a front facing polygon or back facing polygon.

22. The method of claim 20 wherein said determining step comprises performing a direction algorithm in said geometry accelerator to determine whether the primitive to be processed by said lighting machine is a front facing polygon or a back facing polygon.

23. The method of claim 20, wherein said receiving step includes a step of receiving a mode bit in said geometry accelerator, said mode bit indicating either that said geometry accelerator is to perform a direction algorithm to determine whether a primitive to be processed by said lighting machine is a front facing polygon or a back facing polygon or that said geometry accelerator is to analyze one or more bits in said command data to determine whether a primitive to be processed by said lighting machine is a front facing polygon or a back facing polygon.

* * * * *

UNITED STATES PATENT AND TRADEMARK OFFICE
CERTIFICATE OF CORRECTION

PATENT NO. : 5,886,711 Page 1 of 1
DATED : March 23, 1999
INVENTOR(S) : Theodore G. Rossin et al.

It is certified that error appears in the above-identified patent and that said Letters Patent is hereby corrected as shown below:

Column 5,
Line 25, delete "machine 28.5" and insert therefor -- machine 28. --

Signed and Sealed this

Eleventh Day of June, 2002

Attest:

Attesting Officer

JAMES E. ROGAN
Director of the United States Patent and Trademark Office